(12) United States Patent
Lee et al.

(10) Patent No.: US 10,397,035 B2
(45) Date of Patent: Aug. 27, 2019

(54) TRANSMISSION/RECEPTION APPARATUS AND METHOD FOR WIRELESS COMMUNICATION SYSTEM

(71) Applicant: LG ELECTRONICS INC., Seoul (KR)

(72) Inventors: Wookbong Lee, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/561,726

(22) PCT Filed: Nov. 19, 2015

(86) PCT No.: PCT/KR2015/012457
§ 371 (c)(1),
(2) Date: Sep. 26, 2017

(87) PCT Pub. No.: WO2016/159476
PCT Pub. Date: Oct. 6, 2016

(65) Prior Publication Data
US 2018/0091347 A1 Mar. 29, 2018

Related U.S. Application Data

(60) Provisional application No. 62/138,989, filed on Mar. 27, 2015, provisional application No. 62/139,772, filed on Mar. 29, 2015.

(51) Int. Cl.
*H04W 4/00* (2018.01)
*H04L 27/26* (2006.01)
*H04L 5/00* (2006.01)
*H04W 28/06* (2009.01)
*H04W 72/04* (2009.01)
*H04W 84/12* (2009.01)

(52) U.S. Cl.
CPC ........ *H04L 27/2613* (2013.01); *H04L 5/0048* (2013.01); *H04L 5/0053* (2013.01); *H04L 27/2602* (2013.01); *H04W 28/06* (2013.01); *H04W 72/042* (2013.01); *H04W 72/0446* (2013.01); *H04W 84/12* (2013.01)

(58) Field of Classification Search
CPC ............. H04L 27/2613; H04L 27/2602; H04L 5/0053; H04L 5/0048; H04W 28/06; H04W 72/0446; H04W 72/042; H04W 84/12
USPC ....................................................... 370/329
See application file for complete search history.

(56) References Cited

U.S. PATENT DOCUMENTS

2012/0177144 A1 7/2012 Lee et al.
2013/0177090 A1 7/2013 Yang et al.
(Continued)

FOREIGN PATENT DOCUMENTS

WO   WO 2014/171788 A1   10/2014

*Primary Examiner* — Mang Hang Yeung
(74) *Attorney, Agent, or Firm* — Birch, Stewart, Kolasch & Birch, LLP

(57) ABSTRACT

Disclosed herein is a station (STA) device of a wireless LAN (WLAN) system. The STA device includes a radio frequency (RF) unit transmitting and receiving a radio signal; and a processor controlling the RF unit. The processor may generate a high efficiency (HE) physical protocol data unit (PPDU) including a physical preamble and a data field and transmit the PPDU using the RF unit.

4 Claims, 15 Drawing Sheets

(56) References Cited

U.S. PATENT DOCUMENTS

| | | |
|---|---|---|
| 2013/0266083 A1 | 10/2013 | Baik et al. |
| 2014/0211775 A1 | 7/2014 | Sampath et al. |
| 2016/0088602 A1* | 3/2016 | Seok .................... H04L 5/0055 370/338 |
| 2016/0127948 A1* | 5/2016 | Azizi ................. H04L 27/2613 370/338 |
| 2016/0227436 A1* | 8/2016 | Vermani ............... H04W 28/06 |

\* cited by examiner

[Figure 1]
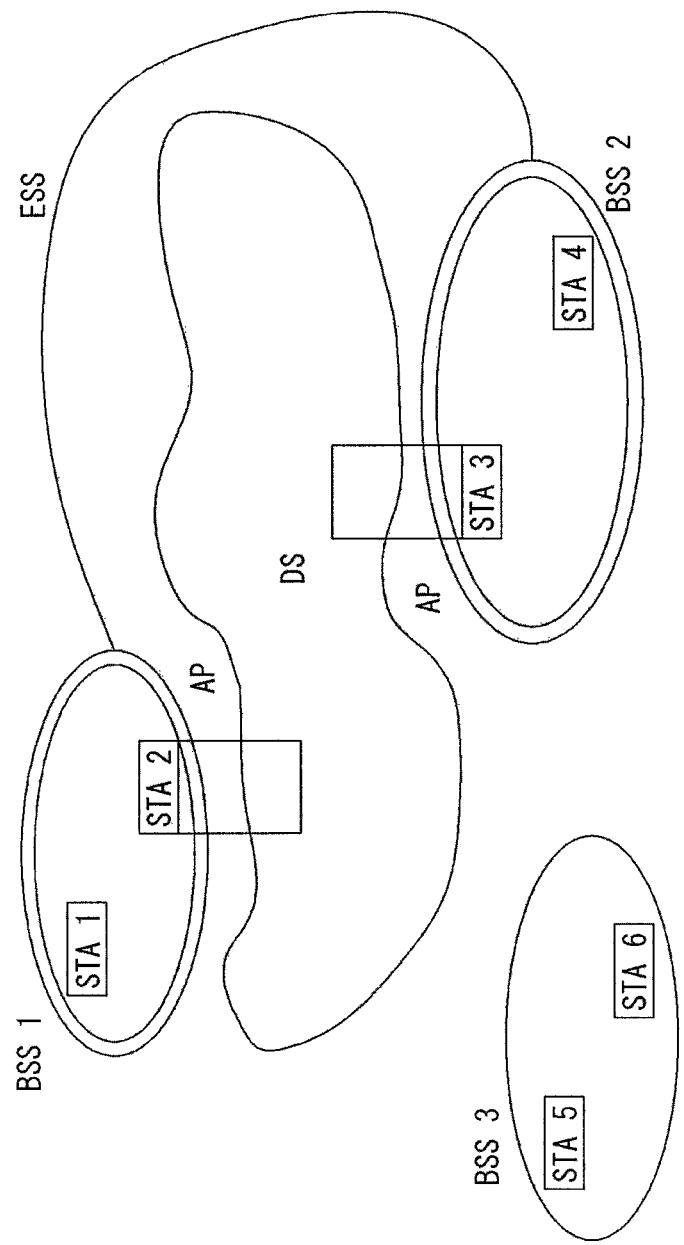

[Figure 2]
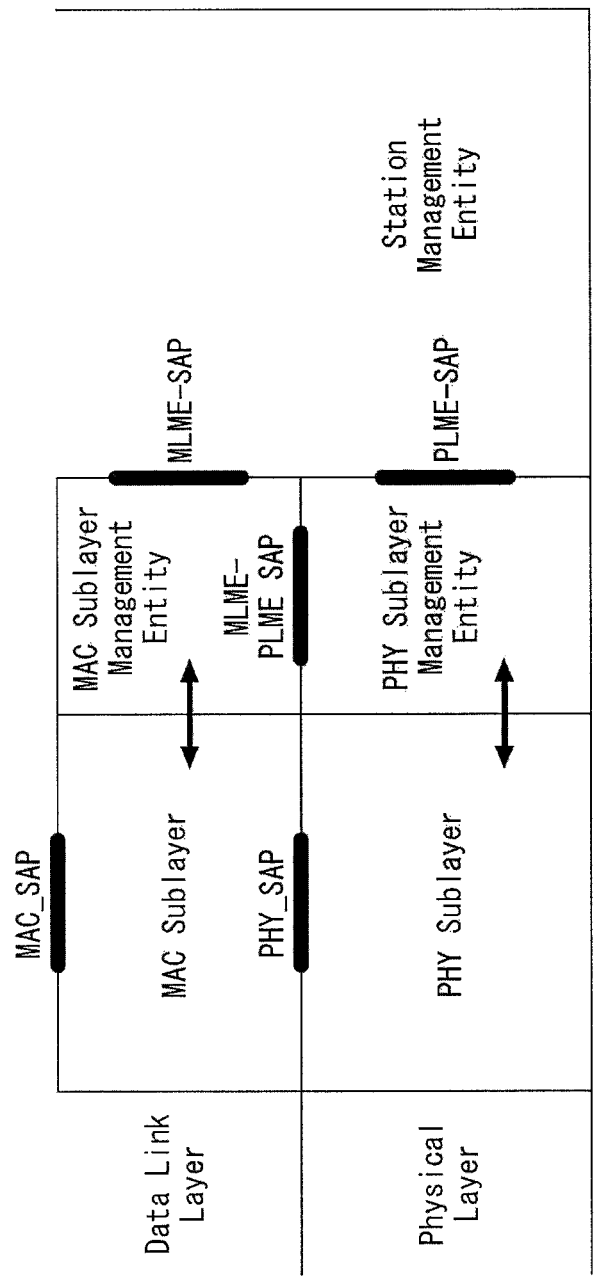

[Figure 3]
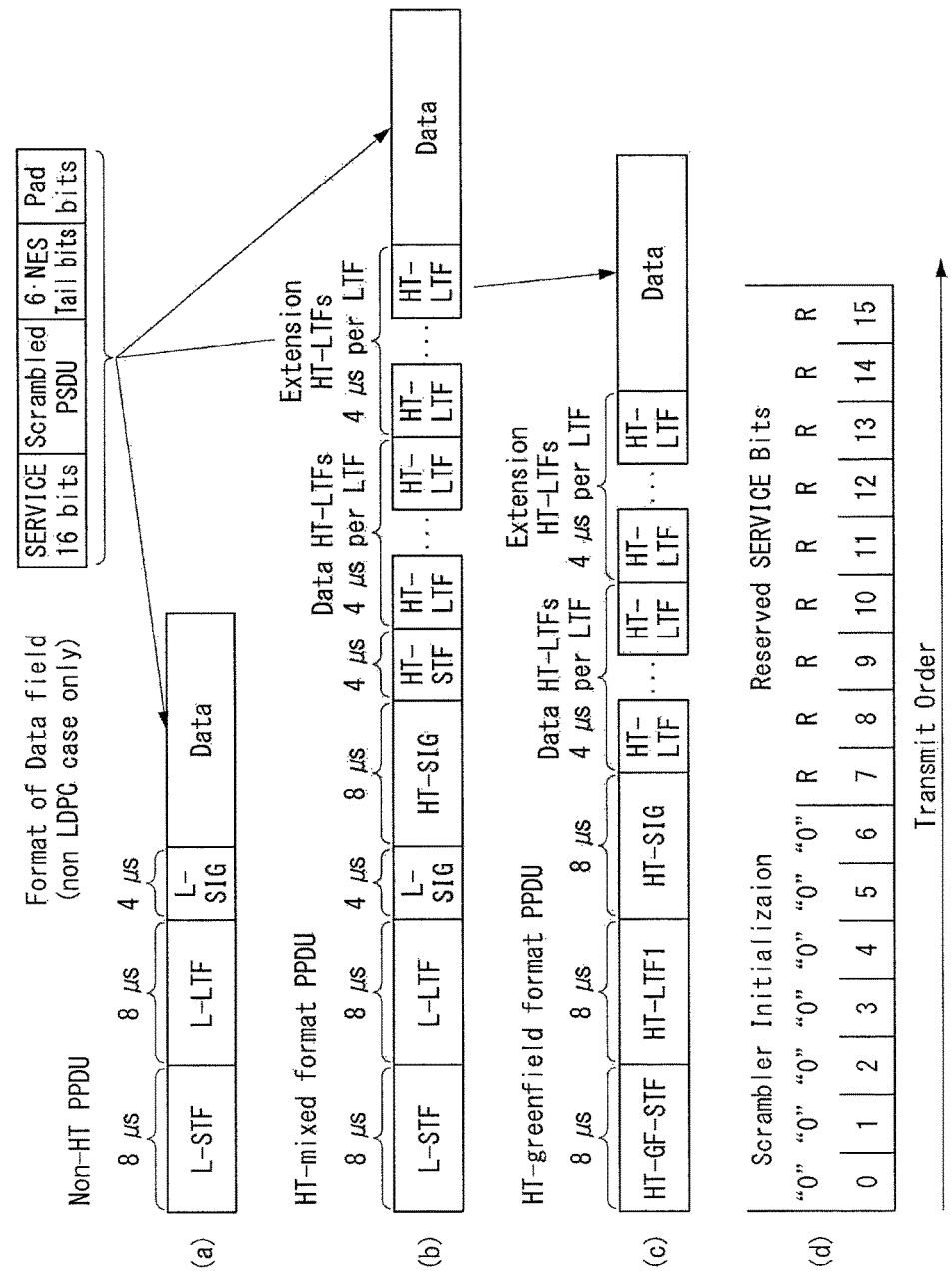

[Figure 4]
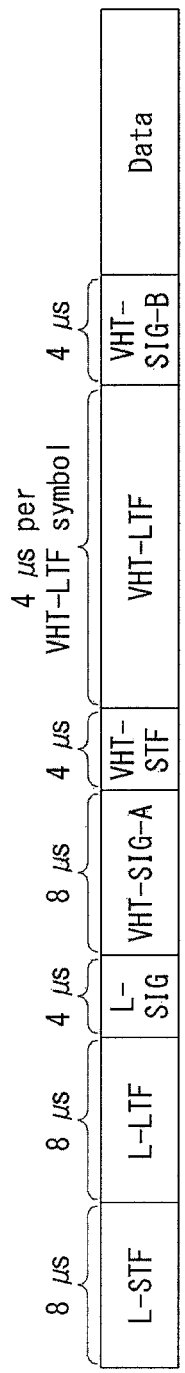

[Figure 5]
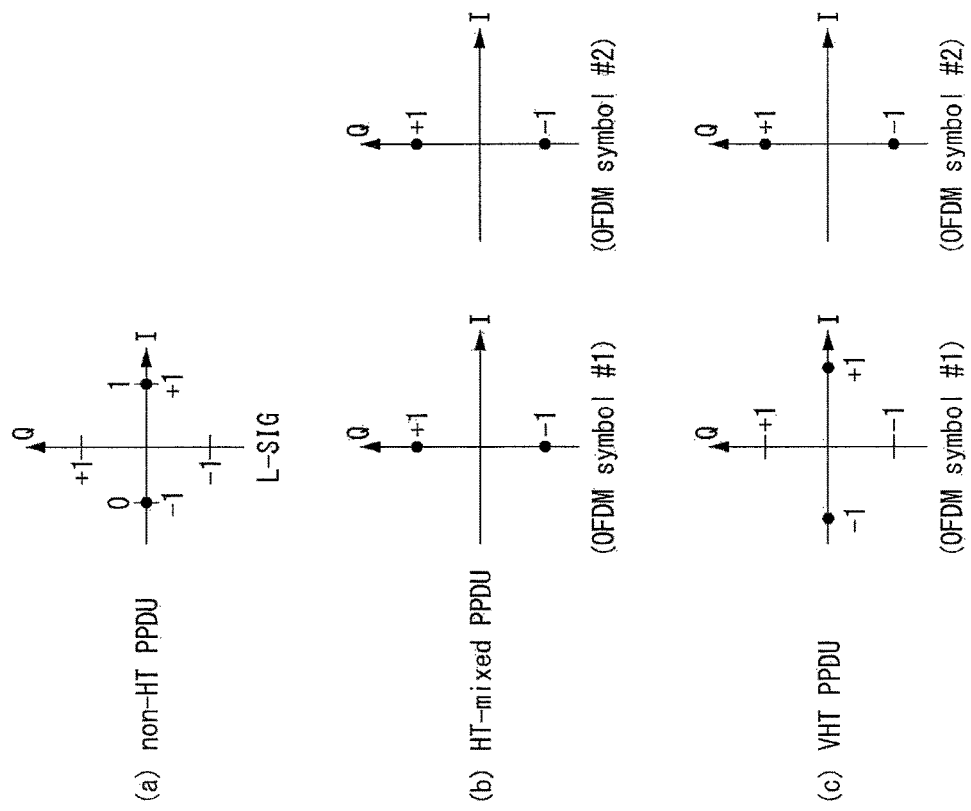

[Figure 6]
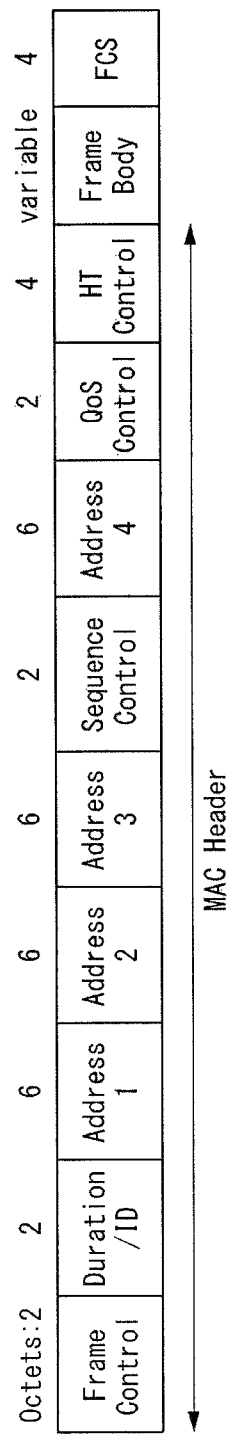

[Figure 7]

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Frag-ments | Retry | Power Management | More Data | Protected Frame | Order |
| 2 | 2 | 4 | 1 | 1 | 1 | 1 | 1 | 1 | 1 | 1 |

Bits:

【Figure 8】
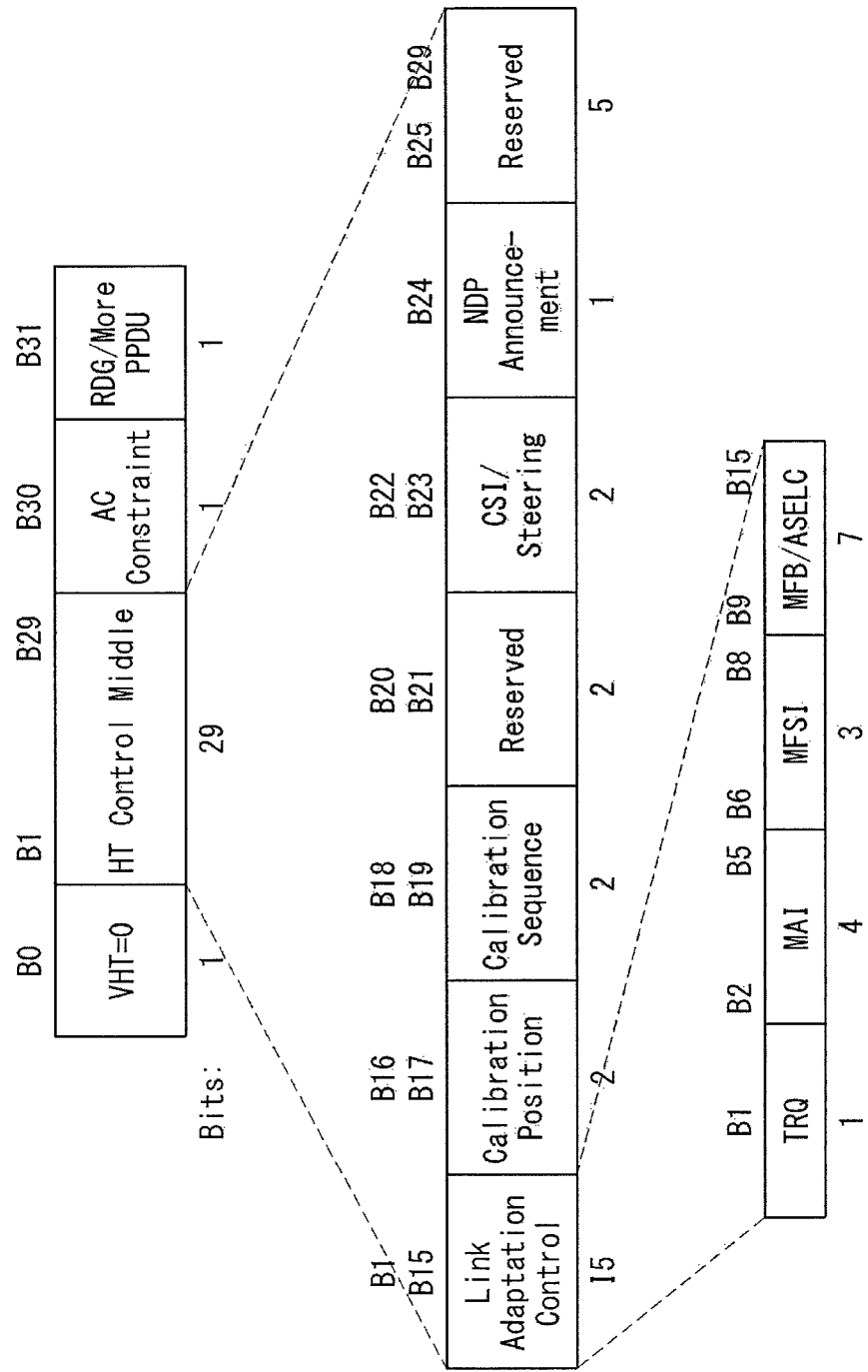

[Figure 9]
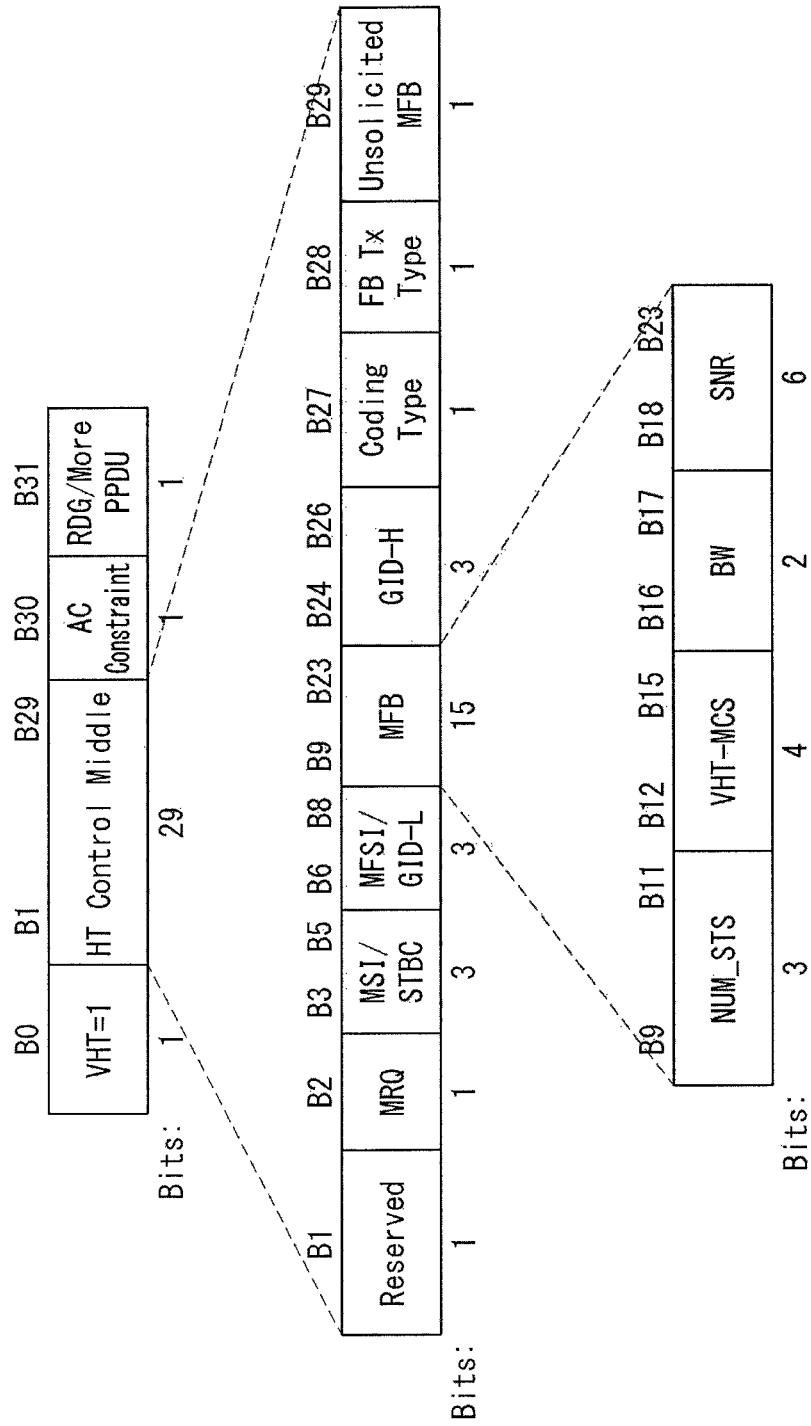

[Figure 10]
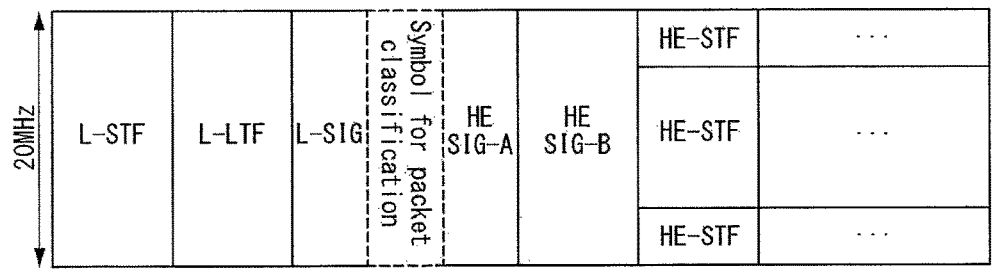

[Figure 11]
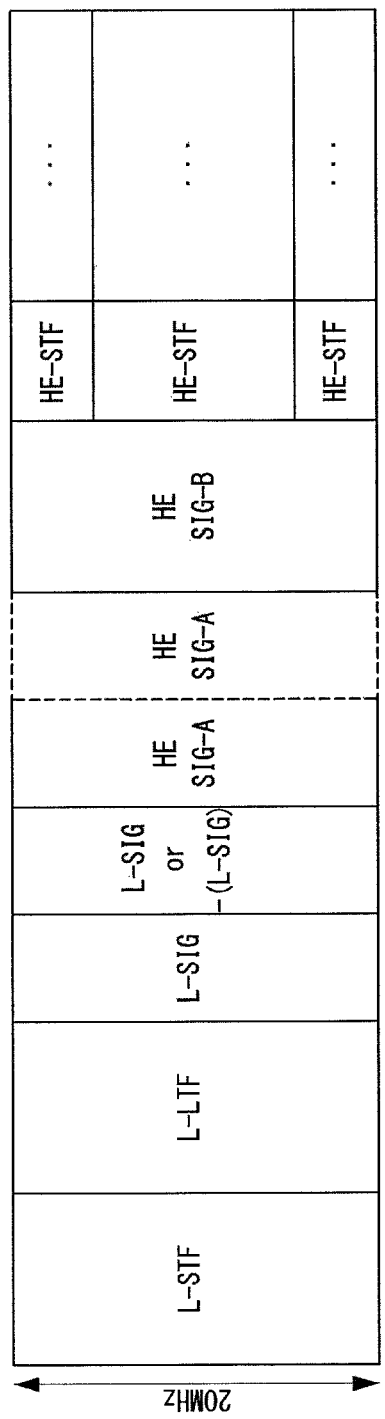

[Figure 12]
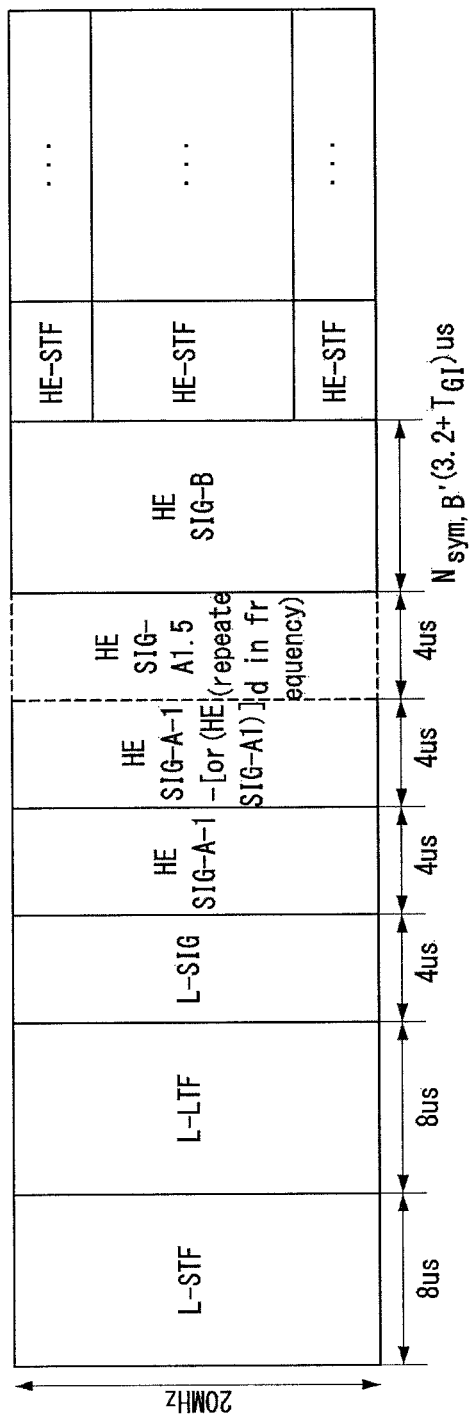

[Figure 13]

| A | A or -A | B |
|---|---|---|
|   |   | B |

1ˢᵗ   2ⁿᵈ   3ʳᵈ HE-SIG-A symbol

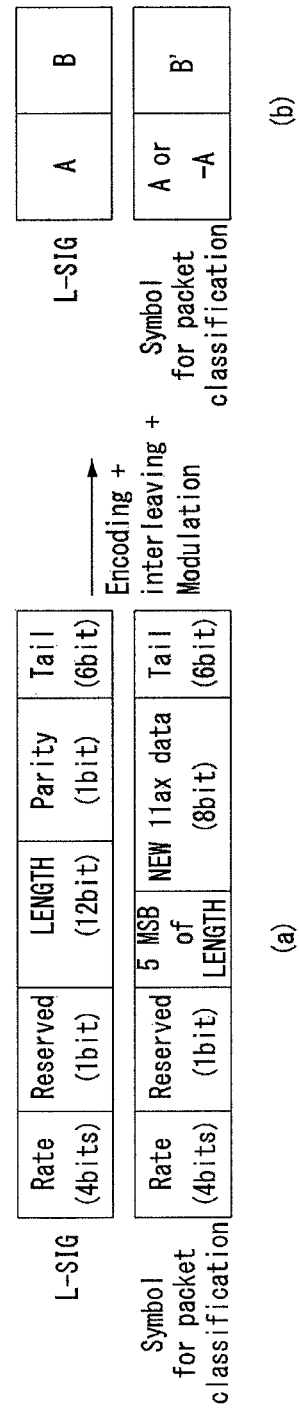
[Figure 14]

[Figure 15]
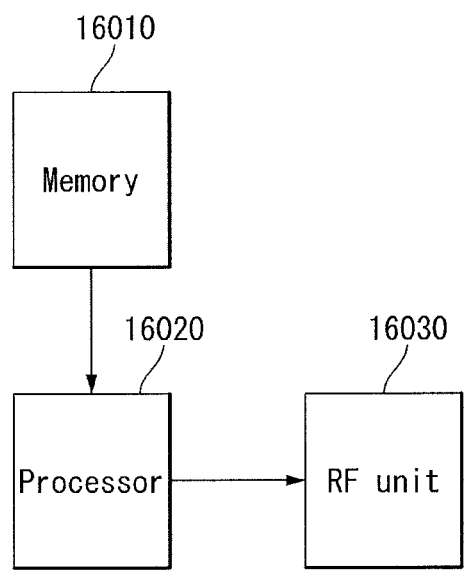
[Figure 16]
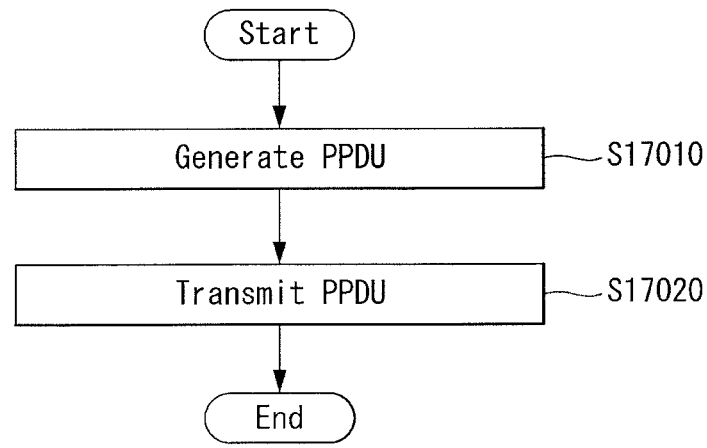
[Figure 17]

TRANSMISSION/RECEPTION APPARATUS AND METHOD FOR WIRELESS COMMUNICATION SYSTEM

CROSS REFERENCE TO RELATED APPLICATIONS

This application is the National Phase of PCT/KR2015/012457 filed on Nov. 19, 2015, which claims priority under 35 U.S.C. § 119(e) to U.S. Provisional Application Nos. 62/138,989 filed on Mar. 27, 2015 and 62/139,772 filed on Mar. 29, 2015, all of which are hereby expressly incorporated by reference into the present application.

TECHNICAL FIELD

The present invention relates to a wireless communication system and, more particularly, to a method for configuring a signal frame, particularly, for configuring a preamble included in signal frame when performing signal processing in a Wireless Local Area Network (WLAN) wireless communication system and a device performing the method.

BACKGROUND ART

Wi-Fi is a wireless local area network (WLAN) technology which enables a device to access the Internet in a frequency band of 2.4 GHz, 5 GHz or 6 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

As described above, new frame formats and numerologies for an 802.11ax system, that is, the next-generation wireless LAN system, are actively discussed.

More specifically, in order to enhance the throughput of a system or to enhance the robustness of inter-symbol interference (ISI) in an outdoor environment, it is expected that an FFT size increased compared to the existing FFT size in a given system bandwidth will be applied. Furthermore, the extension of a multi-user transmission method proposed in the existing 802.11ac system to an uplink situation and the introduction of an OFDMA transmission method are also discussed along with the increased FFT size.

More specifically, an efficient method for configuring a signal frame and a method for configuring training fields according to the introduction of an OFDMA scheme are important problems.

Technical Solution

In order to solve the technical problem, an embodiment of the present invention propose an STA device and a method for transmitting data performed by an STA device in a WLAN system.

In a wireless LAN (WLAN) system according to the present invention, a station (STA) device includes a radio frequency (RF) unit transmitting and receiving a radio signal; and a processor controlling the RF unit. The processor generates a high efficiency (HE) physical protocol data unit (PPDU) including a physical preamble and a data field and transmits the PPDU using the RF unit, and the physical preamble includes a legacy preamble and an HE preamble.

In the STA device according to an embodiment of the present invention, the legacy preamble includes an L-Short Training Field (STF), an L-Long Training Field (LTF) and an L-SIG field, the HE preamble includes an HE-SIG-A field, an HE-SIG-B field, an HE-STF and an HE-LTF, and the legacy preamble further includes a repeated L-SIG field for classifying the HE PPDU.

In the STA device according to an embodiment of the present invention, the repeated L-SIG field includes a second symbol in which a first symbol constructing the L-SIG field is repeated in a time domain. In addition, the second symbol includes at least one of a first subcarrier that carries same information as at least one type of information included in the L-SIG field and at least one of a second subcarrier that carries different information from at least one type of information included in the L-SIG field.

In a wireless LAN (WLAN) system according to the present invention, the HE preamble further includes at least one repeated HE-SIG-A field in which data of the HE-SIG-A field is repeated. In addition, at least one of the repeated HE-SIG-A field includes a symbol in which data of the HE-SIG-A is repeated in a time domain or a frequency domain.

A method for transmitting data performed by a station (STA) device in a wireless LAN (WLAN) system includes generating a physical protocol data unit (PPDU) including a physical preamble and a data field, and transmitting the PPDU, and the physical preamble includes a legacy preamble and a high efficiency (HE) preamble.

Technical Effects

The present invention proposes a signal structure used in the next-generation WIFI system. As a receiver identifies 802.11ax signal fast, a reception signal may be processed with lower latency. As a method for identifying the reception signal, a specific symbol of a preamble may use a constellation or a phase difference of consecutive two symbols. According to the present invention, a symbol of L-SIG field is repeated, and a receiver may identify a HE-PPDU faster, and accordingly, an efficient and fast reception signal processing becomes available.

In addition, in the repeated L-SIG signal, the same information is repeated in a part of the signal and new information is carried on a part of the signal, and accordingly, the loss of data transmission amount owing to the signal repetition for identification may be minimized and new information may be additionally transmitted.

Furthermore, selectively, HE-SIG-A field is repeated, the system efficiency may be increased by identifying HE-PPDU. In such as case, since the structure of the legacy preamble part is not changed, the influence on the signal process of legacy receivers may be minimized. In addition, the information of the HE-SIG-A is repeated on the time axis/frequency axis, and accordingly, the signal identification performance may be increased. At the same time, new signal information is transmitted, and thus, the data transmission efficiency may be improved.

The other effects of the present invention will be described additionally in the embodiments below.

DESCRIPTION OF DRAWINGS

FIG. 1 is a diagram showing an example of an IEEE 802.11 system to which an embodiment of the present invention may be applied.

FIG. 2 is a diagram illustrating the configuration of layer architecture of an IEEE 802.11 system to which an embodiment of the present invention may be applied.

FIG. 3 illustrates a non-HT format PPDU and an HT format PPDU in a wireless communication system to which an embodiment of the present invention may be applied.

FIG. 4 illustrates a VHT format PPDU in a wireless communication system to which an embodiment of the present invention may be applied.

FIG. 5 is a diagram illustrating a constellation for classifying the format of a PPDU in a wireless communication system to which an embodiment of the present invention may be applied.

FIG. 6 illustrates the format of an MAC frame in an IEEE 802.11 system to which an embodiment of the present invention may be applied.

FIG. 7 is a diagram illustrating a frame control field within an MAC frame in a wireless communication system to which an embodiment of the present invention may be applied.

FIG. 8 illustrates the HT format of an HT control field in the MAC frame of FIG. 6.

FIG. 9 illustrates the VHT format of an HT control field in a wireless communication system to which an embodiment of the present invention may be applied.

FIG. 10 illustrates a data structure of an HE-PPDU according to an embodiment of the present invention.

FIG. 11 illustrates an HE signal frame structure according to an embodiment of the present invention.

FIG. 12 illustrates an HE signal frame structure according to another embodiment of the present invention.

FIG. 13 illustrates an arrangement method of the HE-SIG-A described in FIG. 12.

FIG. 14 illustrates a repeated L-SIG signal configuration method according to an embodiment of the present invention.

FIG. 15 illustrates a repeated L-SIG signal configuration method according to an embodiment of the present invention.

FIG. 16 illustrates an STA device according to an embodiment of the present invention.

FIG. 17 is a flowchart illustrating a data transmission method performed by an STA device according to an embodiment of the present invention.

BEST MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technical spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC)

layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrates a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field. The L-SIG field may include information about a data rate and a data length.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, and L-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 16 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4 illustrates a VHT format PPDU for supporting an IEEE 802.11ac system.

Referring to FIG. 4, the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field may include information for modulation, encoding and rate-matching of each VHT-STA. The size of the VHT-SIG-B field may different from channel bandwidth used for PPDU transmission or from MIMO transmission types (MU-MIMO or SU-MIMO).

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail with reference to FIG. 5.

FIG. 5 is a diagram illustrating a constellation for classifying the format of a PPDU in a wireless communication system to which an embodiment of the present invention may be applied.

FIG. 5(a) illustrates the constellation of an L-SIG field included in a non-HT format PPDU, FIG. 5(b) illustrates phase rotation for HT mixed format PPDU detection, and FIG. 5(c) illustrates phase rotation for VHT format PPDU detection.

In order to determine a non-HT format PPDU, an HT-GF format PPDU, an HT mixed format PPDU, and a VHT format PPDU, an STA uses an L-SIG field and the phase of the constellation of OFDM symbols transmitted after the L-SIG field. That is, the STA may determine a PPDU format based on the L-SIG field of the received PPDU and/or the phase of the constellation of OFDM symbols transmitted after the L-SIG field.

Referring to FIG. 5(*a*), binary phase shift keying (BPSK) is used as OFDM symbols forming an L-SIG field.

First, in order to determine an HT-GF format PPDU, an STA determines whether a detected SIG field is an L-SIG field when the first SIG field is detected in a received PPDU. That is, the STA attempts decoding based on a constellation, such as the example of FIG. 5(*a*). When the decoding fails, the STA may determine a corresponding PPDU to be not an HT-GF format PPDU.

Next, in order to determine a non-HT format PPDU, an HT mixed format PPDU, and a VHT format PPDU, the phase of the constellation of OFDM symbols transmitted after the L-SIG field may be used. That is, a method for modulating the OFDM symbols transmitted after the L-SIG field may be different. An STA may determine a PPDU format based on a modulation method for a field after the L-SIG field of the received PPDU.

Referring to FIG. 5(*b*), in order to determine an HT mixed format PPDU, the phases of two OFDM symbols transmitted after the L-SIG field in the HT mixed format PPDU may be used.

More specifically, the phases of an OFDM symbol #1 and OFDM symbol #2 corresponding to an HT-SIG field transmitted after the L-SIG field in the HT mixed format PPDU are counterclockwise rotated 90 degrees. That is, quadrature binary phase shift keying (QBPSK) is used as a method for modulating the OFDM symbol #1 and the OFDM symbol #2. A QBPSK constellation may be a constellation whose phase has been counterclockwise rotated 90 degrees based on a BPSK constellation.

An STA attempts decoding for a first OFDM symbol and second OFDM symbol corresponding to an HT-SIG field transmitted after the L-SIG field of the received PPDU based on a constellation, such as the example of FIG. 5(*b*). If the decoding is successful, the STA determines that the corresponding PPDU is an HT format PPDU.

Next, in order to determine a non-HT format PPDU and a VHT format PPDU, the phase of the constellation of OFDM symbols transmitted after the L-SIG field may be used.

Referring to FIG. 5(*c*), in order to determine a VHT format PPDU, the phases of two OFDM symbols transmitted after the L-SIG field in the VHT format PPDU may be used.

More specifically, the phase of an OFDM symbol #1 corresponding to a VHT-SIG-A field after the L-SIG field in the VHT format PPDU is not rotated, but the phase of an OFDM symbol #2 is counterclockwise rotated 90 degrees. That is, BPSK is used as a modulation method for the OFDM symbol #1, and QBPSK is used as a modulation method for the OFDM symbol #2.

An STA attempts decoding for the first OFDM symbol and second OFDM symbol corresponding to the VHT-SIG field transmitted after the L-SIG field of the received PPDU based on a constellation, such as the example of FIG. 5(*c*). If the decoding is successful, the STA may determine that the corresponding PPDU is a VHT format PPDU.

In contrast, if the decoding fails, the STA may determine the corresponding PPDU is a non-HT format PPDU.

MAC Frame Format

FIG. 6 illustrates the format of an MAC frame for an IEEE 802.11 system to which an embodiment of the present invention may be applied.

Referring to FIG. 6, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field includes information about the characteristics of a corresponding MAC frame. The frame control field is described in more detail later.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as an MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 7 is a diagram illustrating a frame control field within an MAC frame in a wireless communication system to which an embodiment of the present invention may be applied.

Referring to FIG. 7, the frame control field includes a protocol version subfield, a type subfield, a subtype subfield, a To DS subfield, a From DS subfield, a more fragments subfield, a retry subfield, a power management subfield, a more data subfield, a protected frame subfield, and an order subfield.

The protocol version subfield may indicate the version of a WLAN protocol applied to a corresponding MAC frame.

The type subfield and the subtype subfield may be configured to indicate information to identify the function of a corresponding MAC frame.

The type of an MAC frame may include three frame types: a management frame, a control frame, and a data frame.

Furthermore, each of the frame types may be divided into subtypes.

For example, the control frames may include a request to send (RTS) frame, a clear-to-send (CTS) frame, an acknowledgment (ACK) frame, a PS-poll frame, a contention free (CF)-end frame, a CF-end+CF-ACK frame, a block acknowledgment (ACK) request (BAR) frame, a block acknowledgment (ACK) (BA) frame, a control wrapper (control+HT control) frame, a VHT null data packet announcement (NDPA) frame, and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information required to interpret an Address 1 field to an Address 4 field included in the header of a corresponding MAC frame. In the case of a control frame, both the To DS subfield and the From DS subfield are set to "0." In the case of the management frame, the To DS subfield and the From DS subfield may be sequentially set to "1" and "0" if a corresponding frame is a QoS management frame (QMF), and may be sequentially set to "0" and "0" if a corresponding frame is not a QMF.

The More Fragments subfield may indicate whether a fragment to be transmitted after a corresponding MAC frame is present. The More Fragments subfield may be set to "1" if another fragment of a current MSDU or MMPDU is present, and may be set to "0" if another fragment of a current MSDU or MMPDU is not present.

The retry subfield may indicate whether a corresponding MAC frame is based on the retransmission of a previous MAC frame. The retry subfield may be set to "1" if a corresponding MAC frame is based on the retransmission of a previous MAC frame, and may be set to "0" if a corresponding MAC frame is not based on the retransmission of a previous MAC frame.

The power management subfield may indicate power management mode of an STA. If the value of the power management subfield is "1", it may indicate that an STA should switch to power save mode.

The more data subfield may indicate whether an MAC frame to be additionally transmitted is present. The more data subfield may be set to "1" if an MAC frame to be additionally transmitted is present, and may be set to "0" if an MAC frame to be additionally transmitted is not present.

The protected frame subfield may indicate whether a frame body field has been encrypted. The protected frame subfield may be set to "1" if the frame body field includes information processed by a cryptographic encapsulation algorithm, and may be set to "0" if the frame body field does not include information processed by a cryptographic encapsulation algorithm.

The pieces of information included in each of the aforementioned fields may comply with the definition of the IEEE 802.11 system. Furthermore, each of the aforementioned fields corresponds to an example of fields which may be included in an MAC frame, but the present invention is not limited thereto. That is, each of the aforementioned fields may be substituted with another field or may further include an additional field, and all of the fields may not be essentially included.

FIG. 8 illustrates the HT format of an HT control field in the MAC frame of FIG. 6.

Referring to FIG. 8, the HT control field may include a VHT subfield, an HT control middle subfield, an AC constraint subfield, and a reverse direction grant (RDG)/more PPDU subfield.

The VHT subfield indicates whether the HT control field has the format of an HT control field for VHT (VHT=1) or has the format of an HT control field for HT (VHT=0). In FIG. 8, it is assumed that the HT control field is an HT control field for VHT (i.e., VHT=1). The HT control field for VHT may be called a VHT control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set to "1" if an RDG is present, and the RDG/more PPDU subfield is set to "0" if an RDG is not present. Assuming that a corresponding field is transmitted by an RD responder, the RDG/more PPDU subfield is set to "1" if a PPDU including the corresponding subfield is the last frame transmitted by the RD responder, and the RDG/more PPDU subfield is set to "0" if another PPDU is transmitted.

The HT control middle subfield of an HT control field for HT may include a link adaptation subfield, a calibration position subfield, a calibration sequence subfield, a reserved subfield, a channel state information (CSI)/steering subfield, an HT null data packet (NDP) announcement subfield, and a reserved subfield.

The link adaptation subfield may include a training request (TRQ) subfield, a modulation and coding scheme (MCS) request or antenna selection indication (ASEL) (MAI) subfield, an MCS feedback sequence identifier (MFSI) subfield, and an MCS feedback and antenna selection command/data (MFB/ASELC) subfield.

The TRQ subfield may be set to "1" if the transmission of a sounding PPDU is requested from a responder, and may be set to "0" if the transmission of a sounding PPDU is not requested from a responder.

If the MAI subfield is set to 14, it indicates an ASEL indication, and the MFB/ASELC subfield is interpreted as an antenna selection command/data. If not, the MAI subfield indicates an MCS request, and the MFB/ASELC subfield is interpreted as MCS feedback.

If the MAI subfield indicates an MCS request (MRQ), the MAI subfield is interpreted as including an MCS request (MRQ) and an MRQ sequence identifier (MSI). The MRQ subfield is set to "1" if MCS feedback is requested, and is set to "0" if MCS feedback is not requested. When the MRQ subfield is "1", the MSI subfield includes a sequence number for specifying an MCS feedback request. When the MRQ subfield is "0", the MSI subfield is set as reserved bits.

Each of the aforementioned subfields corresponds to an example of subfields which may be included in the HT control field, and may be substituted with another subfield or may further include an additional subfield.

FIG. 9 illustrates the VHT format of an HT control field in a wireless communication system to which an embodiment of the present invention may be applied.

Referring to FIG. 9, the HT control field may include a VHT subfield, an HT control middle subfield, an AC constraint subfield, and a reverse direction grant (RDG)/more PPDU subfield.

In FIG. 9, an HT control field for VHT (i.e., VHT=1) is assumed and described. The HT control field for VHT may be denoted as a VHT control field.

A description of the AC constraint subfield and the RDG/More PPDU subfield is the same as that described with reference to FIG. 8 and is omitted.

As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field or may further include additional fields, and all of the fields may not be essentially included.

HE System

A next-generation WLAN system is described below. The next-generation WLAN system is a next-generation WIFI system. One embodiment of such a next-generation WIFI system may be IEEE 802.11ax, for example. In this specification, the following next-generation WLAN system is named a high efficiency (HE) system. The frame, PPDU, etc. of such a system may be called an HE frame, an HE PPDU, an HE preamble, an HE-SIG field, an HE-STF, an HE-LTF, etc.

A description of an existing WLAN system, such as the aforementioned VHT system, may be applied to contents not additionally described with respect to an HE system. For example, the description of the VHT-SIG A field, VHT-STF, VHT-LTF, and VHT-SIG-B field may be applied to the HE-SIG A field, HE-STF, HE-LTF, and HE-SIG-B field. The HE frame, preamble, etc. of the proposed HE system may be used in other wireless communication or cellular systems. An HE STA may be a non-AP STA or an AP STA as described above. In the following specification, although it is an STA, such an STA device may represent an HE STA device. In the following specification and accompanying drawings, the HE-SIG-A may be denoted as an HE-SIG-1 and the HE-SIG-B may be denoted as an HE-SIG-2.

The HE-SIG A field may include common control information in common transmitted to STAs which receive a PPDU. The HE-SIG A field may be transmitted in 1 to 3 OFDM symbols. The HE-SIG A field is duplicated in a 20 MHz unit and may include the same information. Furthermore, the HE-SIG-A field provides notification of information about the full bandwidth of a system. In an embodiment, the HE-SIG A field may include at least one of bandwidth information, group ID information, stream information, UL indication information, guard interval indication information, allocation information, and transmission power information.

The HE-SIG B field may include user-specific information that is necessary for each STA to receive and process its own data (e.g., a PSDU). In an embodiment, the HE-SIG B field may be transmitted in one or two OFDM symbols. For example, the HE-SIG B field may include information about the modulation and coding scheme (MCS) of a corresponding PSDU and the length of a corresponding PSDU.

An HE-Short Training Field (STF) may be used to improve automatic gain control (AGC) estimation in MIMO transmission. An HE-STF may be generated using the sequence of a frequency domain for a specific band. An HE-long training field (LTF) is used to estimate an MIMO channel between reception chains in a receiver and sets of constellation mapper outputs. A physical preamble includes an HE-LTF symbol. The data tones of each HE-LTF symbol may be multiplied by entries belonging to a P matrix. By using the P matrix, a receiver can track phase and frequency offsets during MIMO channel estimation. There is provided orthogonality between the rows of the P matrix. In other words, the P matrix is indicative of an orthogonal mapping matrix multiplied by an LTF.

Furthermore, in the HE system, for average throughput enhancement and outdoor robust transmission, an FFT size four times greater than that of an existing WLAN system is to be used. If a 4×FFT scheme is applied, the symbol period of a symbol to which the 4×FFT scheme has been applied is four times. This corresponds to an embodiment in which a constant full bandwidth is used and subcarrier spacing of ¼ times is used if a 4×FFT size is used. The period of one symbol may be four times (4×) because subcarrier spacing is ¼.

Furthermore, a 1×FFT size, that is, a basis for the 4×FFT size, may be an FFT size of a VHT system (IEEE 802.11ac). Accordingly, the 1×FFT size, that is, a basis for the 4×FFT size, may correspond to an FFT size of a legacy preamble part (an L-STF, an L-LTF, and an L-SIG) of a frame. The period of one preamble for the 1×FFT may be the sum of an IDFT/DFT period of 3.2 μs and the period of a guard interval symbol. A long guard interval period maybe 4 us (3.2+0.8), and a short guard interval period may be 3.6 μs (3.2+0.4). Since the symbol period of a data part is 3.2 μs, one symbol period may be 12.8 μs if the 4×FFT scheme is applied in the HE system. Alternatively, the symbol period of the data part is four times the IDFT/DFT period and may be represented as 12.8 μs.

In the HE system, an OFDMA scheme may be used to send/receive more data to/from a plurality of STAs at the same time. Orthogonal frequency division multiple access (OFDMA) is a multi-user version of an OFDM digital modulation scheme. The OFDMA scheme is a method in which one user does not exclusively posses multiple carriers according to the OFDM scheme, that is, subcarriers, but a plurality of users to each of which a partial set of subcarriers is allocated and uses the subcarriers. A subcarrier used in OFDMA may be called a tone. Such tones may be allocated to each user in a subblock unit depending on a tone plan.

In the following specification, an embodiment of the present invention proposes a signal frame structure of a PPDU transmitted/received in the HE system.

FIG. 10 illustrates a data structure of an HE-PPDU according to an embodiment of the present invention.

Hereinafter, auto-detection and physical layer common control information of 802.11ax packet is described. The auto-detection and physical layer common control information of 802.11ax packet may be provided by an HE-SIG-A field and an L-SIG field. Depending on the auto-detection method, a symbol for packet identification may be existed in the preamble structure as shown in FIG. 10. That is, a symbol for classifying a packet may be located behind the L-SIG field as shown in FIG. 10. However, depending on a method, such a symbol may not be existed in the preamble structure.

By using the method described in FIG. 5, the frame/packet may be identified. However, the present invention proposes a method of using a structure in which at least one of the L-SIG or the HE-SIG-A field is repeated in order to improve the packet detection performance for 802.11ax system.

As an embodiment, in order to identify an HE-PPDU, at least one of the L-SIG field or the HE-SIG-A field may be repeated and inserted in the time domain. In the case that one or more symbols are required before the repetition, an STA may repeat the HE-SIG-A field. Otherwise, the system performance may be limited by the performance of the HE-SIG-A field. The HE-SIG-A field may include two symbols, and in the case that only one symbol among the two symbols is repeated, the performance may not be improved. Accordingly, an STA should make all HE-SIG-A symbols be robust in the case that the number of symbols for the HE-SIG-A field is 1 symbol or more. In this case, the repetition of both of the L-SIG field and the HE-SIG-A field may require the duration of long L-SIG field and HE-SIG-A field.

As described above, the HE-SIG-A field may include the common control information that is commonly transmitted to the STAs that receive an HE-PPDU. As an embodiment, the information carried by the HE-SIG-A field may include the following types of information.

BW information (2 bits): Transmit bandwidth indication

GI information (0 or 1 to 2 bits): GI indication may not be needed when it is indicated by polarization of the repeated symbol. The GI information may indicate the information of GI used in data part or subsequent preamble.

MCS information for an HE-SIG-B field (2 bits): The MCS information for an HE-SIG-B field may be signaled, for example, with one of 4 levels (MCS10 (11ah), MCS0, MCS1, MCS3).

Symbol number information for an HE-SIG-B field (4 bits)

BSS-ID information (6 to 7 bits): This is information of an ID for identifying a BSS or coloring, and will be described below.

PPDU length information (0 or 9 bits): The PPDU length information may not be needed when an L-SIG is duplicated.

CRC information for an L-SIG (2 or 0 bits): The CRC for an L-SIG may be needed only when am L-SIG is duplicated and want to improve an L-SIG false positive probability.

Tail (6 bits)

CRC (4 bits)

For the cases of the configuration described above, in the case that an L-SIG is duplicated or both of an L-SIG and an HE-SIG-A field are duplicated, the HE-SIG-A field may include 24 to 27 bits, and an HE-SIG-B field of 1.5 symbols may include 33 to 36 bits.

The MCS information of an HE-SIG-B field may be signaled with 4 levels (MCS10 (11ah), MCS0, MCS1, MCS3) as described above.

The HE-SIG-B field may include user-specific information required for each STA to receive and process its own data (e.g., a PSDU). Accordingly, an AP may control the MCS level of the HE-SIG-B field according to the channel state of user/STA.

As an embodiment, in an outdoor scenario, in the case that the number of HE-SIG-B symbols is greater than 2, the performance is bound by the HE-SIG-B.

Accordingly, in this scenario, it is inevitable to have lower MCS level than MCS0 with respect to the HE-SIG-B field.

As another embodiment, in an indoor scenario, for more than 80% case, even in the case of an STA is in −60 dBm CCA level, the STA obtains downlink SINR over 20 dB in a residential scenario (and more than 95% for −80 dBm CCA level).

As an embodiment, the number of HE-SIG-B symbols may be reached to 16 for MCS0. This may be decreased to 8 for the case of MCS1, and 1 for the case of MCS3.

The HE-SIG-A field may include the BSS-ID information as described above.

In 802.11ax system, in order to improve the frequency reuse performance, the Clear Channel Assessment level may be increased. An STA may not transmit data in the case that a transmission is ongoing in the BSS to which the STA is belonged, and the STA may use a BSS-ID or a BSS coloring bit in order to identify the BSS. It may be preferable that the BSS is detected as quickly as possible. In addition, the HE-SIG-B field may be encoded with a high MCS level. Accordingly, it may be preferable that the BSS-ID information is included in the HE-SIG-A field.

In order to satisfy the object of a CCA level increase and to save the power of an STA, although it may be preferable that enough bits are allocated to the BSS ID information, the resource of the HE-SIG-A field is very limited. Accordingly, as an embodiment, 6 bits may be allocated to the BSS-ID.

Additionally, 1 bit or reserved 1 bit may be added such that all STAs may decode frames. For example, since a UL MU frame is transmitted regardless of the CCA state of an STA which is transmitting, it may be required that the STA applies higher CCA level to the UL MU frame, not to a trigger frame.

FIG. 11 illustrates an HE signal frame structure according to an embodiment of the present invention.

As described above, the present invention represents the HE signal frame structure that may identify an HE packet. For this, as shown in FIG. 11, an L-SIG field may be repeated, and additionally, an HE-SIG-A field may be optionally repeated. The duplicated L-SIG signal which is added to identify an HE-PPDU may be referred to as a repeated L-SIG signal below.

A first embodiment proposes a method for adding only the repeated L-SIG field behind the original L-SIG field.

A second embodiment proposes a method for adding the repeated L-SIG field behind the original L-SIG field, and additionally, adding the repeated HE-SIG-A field behind the original HE-SIG-A field.

As an embodiment, the polarity of the L-SIG may be changed and added as—(L-SIG). In addition, GI of an HE-SIG-B may be represented by the polarity of the L-SIG. As an embodiment, GI of the HE-SIG-B field may be 0.8 us or 1.6 us. For example, in the case that the polarity of repeated L-SIG signal is the same as that of the L-SIG signal, GI may represent 0.8 us. In the case that the polarity of the repeated L-SIG signal is changed or phase-shifted, GI may represent 1.6 us (in the case of the same polarity, GI may represent 1.6 us, and in the case that the polarity is changed, GI may represent 0.8 us).

In the embodiment in which the L-SIG field is repeated described above, 4 additional reference symbols may be used. That is, the HE system may add and use 4 reference tones to L-SIG guard subcarriers. In this case, the use of an HE-SIG-A (before being duplicated) of 1 symbol may be available. In addition, since GI may be signaled by the polarity of the duplicated symbol, in this case, 2 bits may be additionally used. For example, CRC may be included in the L-SIG field. In addition, an STA may transmit the HE-SIG-A using MCS10 in the case that the L-SIG field is repeated.

FIG. 12 illustrates an HE signal frame structure according to another embodiment of the present invention.

Figure 13:
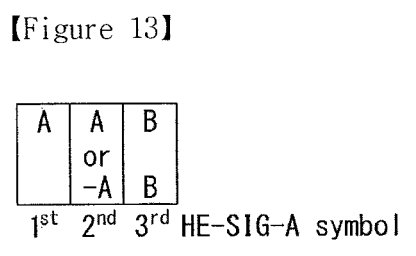

As described above, the present invention represents the HE signal frame structure that may identify an HE packet. For this, as shown in FIG. 12, a signal structure in which an HE-SIG-A field may be repeated and added may be used, and as a repeated symbol, the HE-SIG-A of 1.5 symbols may be used. In other words, the HE-SIG-A of 1.5 symbols may be added behind the HE-SIG-A field of 2 symbols, and the HE-SIG-A field of 1.5 symbols may be repeated in the frequency domain. Such a repetition and structure of the HE-SIG-A symbol will be described in FIG. 13 in more detail.

As an embodiment, GI of an HE-SIG-B may be represented by the polarity of an L-SIG or an HE-SIG-A1 (the first symbol of an HE-SIG-A). As an embodiment, GI of the HE-SIG-B may be 0.4 us, 0.8 us or 2.4 us.

However, the embodiment of FIG. 12 may also be used together with the method of repeating the L-SIG.

FIG. 13 illustrates an arrangement method of the HE-SIG-A described in FIG. 12.

FIG. 13 illustrates a method of using the HE-SIG-A field of 1.5 symbols. In FIG. 13, A represents about ⅔ of the modulation signal of the HE-SIG-A. For example, an STA may configure the first signal of 24 bits to be A and may configure the remaining signal of 12 bits to be B in a modulated GE-SIG-A signal.

As shown in FIG. 13, the first symbol of the HE-SIG-A signal may be A and the second symbol may be added by repeating (A) or reversing (-A) the first symbol A in the time domain. In addition, the 'B' part may be added by being repeated in the frequency domain. As an embodiment, signal B may be transmitted by being located in even tones only or being power-boosted. In addition, the positions of signal A and signal B may be exchanged (a pilot may be located in a pilot position).

In the HE-SIG-A field, BW information and CP information may be located in the front position as available. Using such a configuration, the BW information and the CP information may be decoded fast at a receiver, and accordingly, the HE-SIG-B information may be decoded efficiently and with low latency. As an embodiment, the BW information and the CP information may be located be the first/second fields in the HE-SIG-A field. In the case of the CP information, an STA may perform signaling a CP length of the HE-SIG-B using the information on whether the duplicated signal of signal A is repeated or duplicated.

As an embodiment, in order to decode the HE-SIG-B field easily, at least one of the BW information (2 bits), the GI information (2 bits), the symbol number of the HE-SIG-B signal (4 bits), the MCS of the HE-SIG-B (2 bits) and the BSS color information may be transmitted through the first symbol of the HE-SIG-A. In this case, the first symbol of the HE-SIG-A signal may be a symbol for the packet classification.

As an embodiment, an STA may place all of the HE-SIG-A signals only in the even tones. However, the STA may place a pilot in a pilot position, and a pilot may also be located in a part of odd tones. As another embodiment, an STA may transmit the HE-SIG-A signal information by being duplicated in the frequency domain.

In the embodiments described in the present specification, an STA may transmit the first symbol after the L-SIG using the BPSK, and may transmit the second symbol using the QBPSK which is phase-shifted by 90 degree. For example, in the case that the first symbol and the second symbol after the L-SIG field are duplicated, the second signal may be generated by multiplying the first signal by exp(j*90) or exp(j*-90). In the case that they are reversed and duplicated, on the contrary, the second signal may be generated by multiplying the first signal by exp(j*-90) or exp(j*90).

In the case of the embodiment in which a packet is identified by duplicating and adding the L-SIG signal, the L-SIG symbol may duplicate the entire signal simply. However, hereinafter, more efficient repeated L-SIG signal configuration method is additionally proposed.

FIG. 14 illustrates a repeated L-SIG signal configuration method according to an embodiment of the present invention.

As an embodiment, an STA may duplicate a part of the data contents of an L-SIG signal, and the remaining data contents may transmit new data as a new field. For example, L-SIG 1 symbol may include 24 data bits, and the contents of an L-SIG is transmitted to the front n bits (e.g., 10 bits) among them, and the remaining 24-n bits may transmit the information defined in other 11ax system. In the embodiment of FIG. 14, the repeated L-SIG signal (repeated L-SIG=Symbol for packet classification) may have the configuration as the lower part of the packet.

In FIG. 14(a), the fields in the upper part represent the fields included in the L-SIG signal. In addition, the fields in the lower part represent the fields included in the repeated L-SIG signal. In FIG. 14(a), an embodiment is shown that the repeated L-SIG signal uses 10 bits (5 MBSs of (Rate (4 bits)+reserved (1 bit)+length field) of the L-SIG signal in the same way. Since the length field (12 bits) of the L-SIG field is transmitted in the order from the most significant bit (MBS) to the least significant bits (LSB), the repeated L-SIG signal may include the front 5 bits of the length field. Since 5 MBS fields of the length field represent the front 5 bits of the length field, it may be 5 LBSs of the length value.

Using this method, a reception STA may classify it to be 11ax packet by comparing the subcarriers of front n bits with the corresponding subcarriers of the L-SIG symbol, and may use the remaining bits for signal reception/processing by decoding them. In order for a reception STA to compare the subcarriers, the auto-correlation method may be used. FIG. 14(a) shows an embodiment in the case of n=10 bits. As the mount of the same information is smaller in the L-SIG and the repeated L-SIG, the more new information/data may be transmitted through the L-SIG.

As an embodiment, the added information may include at least one of the BW information (2 bits), the GI information (2 bits), the symbol number of the HE-SIG-A or the HE-SIG-B (4 bits), the MCS of the HE-SIG-A or the HE-SIG-B (2 bits) and the BSS color information. As an embodiment, the tail bit may be 6 bit or smaller, and in the case that it is decreased smaller than 6 bits, new information for 11ax may be included as much as the decreased amount of the tail bit. An STA may newly perform an encoding using the 11ax data, which is newly added part, and the tail bit, and may also perform an encoding using the duplicated bits in the L-SIG being included.

The L-SIG signal and the repeated L-SIG signal, which is a symbol for packet classification, may be shown in FIG. 14(b). When the data/information shown in FIG. 14(a) becomes a signal in a symbol unit through encoding, interleaving and modulation processing, the signal may be shown in FIG. 14(b). In FIG. 14(b), A shows the same information and B' shows the information in relation to 11ax signal which is newly added. A representing the subcarriers showing the same information in the repeated L-SIG signal (symbol for packet classification) may transmit additional information by using symbol polarization as A or –A. In addition, as described above, in the remaining part of the repeated L-SIG signal, the subcarriers B' that represents new information may be included.

FIG. 15 illustrates a repeated L-SIG signal configuration method according to an embodiment of the present invention.

As an embodiment, in the case of configuring a repeated L-SIG symbol (Symbol for packet classification), an STA may transmit only a part of subcarriers A of an L-SIG signal in the same way, and may encode the other subcarriers separately. For example, an STA may transmit a part of the subcarriers on which data is carried in the duplicated symbol for the packet classification, and may transmit the other information using the remaining subcarriers. The other information may be, for example, the signaling information described above which is defined in the 11ax system such as the bandwidth information, the GI information, and the like.

In such a case, a reception STA may compare (e.g., auto-correlation) the same subcarriers on which the same data is carried with respect to the L-SIG symbol and the repeated L-SIG, and accordingly, may classify it as the packet/signal frame of the 11ax system, that is, the HE system. As an embodiment, the information added to the subcarriers B' may include at least one of the BW information (2 bits), the GI information (2 bits), the symbol number of the HE-SIG-B signal (4 bits), the MCS of the HE-SIG-A or the HE-SIG-B (2 bits) and the BSS color information.

When repeating the L-SIG signal, in addition to the embodiment of duplicating only a part of the subcarriers of the repeated L-SIG and allocating the remainder for other information, by changing polarities of the entire or a part of the repeated L-SIG signal additionally, an additional bit may be transmitted. In addition, when encoding data, an STA may increase the data bit part by adjusting the number of tail bits.

FIG. 16 illustrates an STA device according to an embodiment of the present invention.

In FIG. 16, the STA device may include memory 16010, a processor 16020, and an RF unit 16030. Furthermore, as described above, the STA device is an HE STA device and may be an AP or a non-AP STA.

The RF unit 16030 is connected to the processor 16020 and may send/receive a radio signal. The RF unit 16030 may up-convert data received from the processor in a transmission/reception band, and may send the up-converted signal.

The processor 16020 is connected to the RF unit 16030 and may implement a physical layer and/or MAC layer according to an IEEE 802.11 system. The processor 16030 may be configured to perform the operations according to the various embodiments of the present invention in the drawings and description. Furthermore, a module for implementing the operation of the STA according to the various embodiments of the present invention may be stored in the memory 16010 and executed by the processor 16020.

The memory 16010 is connected to the processor 16020 and stores a variety of types of information for driving the processor 16020. The memory 16010 may be included in the processor 16020 or disposed outside the processor 16020 and may be connected to the processor 16020 by known means.

Furthermore, the STA device may include a single antenna or multiple antennas. The contents described in the various embodiments of the present invention may be independently applied to a detailed configuration of the STA device of FIG. 16 or two or more embodiment may be applied to the detailed configuration at the same time.

The data transmission method performed by the STA device shown in FIG. 16, data is described below again along the following flowchart.

FIG. 17 is a flowchart illustrating a data transmission method performed by an STA device according to an embodiment of the present invention.

The aforementioned embodiments may be identically applied in relation to the flowchart. Accordingly, a description redundant with the aforementioned contents is omitted.

Referring to FIG. 17, an STA may generate a PPDU (S17010). Furthermore, the STA may transmit the PPDU (S17020).

The PPDU generated by the STA may be generated and transmitted as the signal structure and the preamble structure described in FIG. 10 to FIG. 17.

The PPDU includes a physical preamble and a data field, and the physical preamble includes a legacy preamble and an HE preamble. The legacy preamble includes an L-Short Training Field (STF), an L-Long Training Field (LTF) and an L-SIG field, and the HE preamble includes an HE-SIG-A field, an HE-SIG-B field, an HE-STF and an HE-LTF.

The legacy preamble may further include a repeated L-SIG field for classifying an HE-PPDU. The repeated L-SIG field for classifying an HE-PPDU and an HE-SIG-A field that may be optionally added are as described in relation to FIG. 10 to FIG. 17 above. Briefly, the repeated L-SIG field may include a second symbol in which a first symbol constructing the L-SIG field is repeated in the time domain. Furthermore, the second symbol may include at least one of a first subcarrier that carries the same information as at least one type of information included in the L-SIG field and at least one of a second subcarrier that carries different information from at least one type of information included in the L-SIG field.

In addition, as an embodiment, the HE preamble may further include at least one repeated HE-SIG-A field in which the data of the HE-SIG-A field is repeated. At least one repeated HE-SIG-A field may include the symbol in which the data of the HE-SIG-A is repeated in the time domain or the frequency domain. The HE-SIG-A field may be 1.5 symbols in which 1.5 symbols are repeated in the frequency domain, and may be added behind two HE-SIG-A symbols.

Those skilled in the art will understand that the present invention may be changed and modified in various ways without departing from the spirit or range of the present invention. Accordingly, the present invention is intended to include all the changes and modifications provided by the appended claims and equivalents thereof.

In this specification, both the apparatus and the method have been described, and the descriptions of both the apparatus and method may be mutually supplemented and applied.

MODE FOR INVENTION

Various embodiments are described in Best mode for invention.

INDUSTRIAL APPLICABILITY

The data transmission/reception methods in the wireless communication system according to an embodiment of the present invention have been illustrated as being applied to an IEEE 802.11 system, but may be applied to various wireless communication systems in addition to the IEEE 802.11 system.

The invention claimed is:

1. A station (STA) device in a wireless local area network (WLAN) system, the STA device comprising:
   a transceiver; and
   a processor controlling the transceiver,
   wherein the processor generates a high efficiency (HE) physical protocol data unit (PPDU) including a physical preamble and a data field, and transmits the PPDU using the transceiver,
   wherein the physical preamble includes a legacy preamble and an HE preamble,
   wherein the legacy preamble includes a Legacy-Short Training Field (L-STF), a Legacy-Long Training Field (L-LTF) and a Legacy-Signal (L-SIG) field,
   wherein the HE preamble includes an HE-SIG-A field, an HE-SIG-B field, an HE-STF and an HE-LTF,
   wherein the L-SIG field is repeatedly transmitted in a time domain,
   wherein a part of the HE-SIG-A field is mapped to a first symbol, and a remaining part of the HE-SIG-A field is mapped to a second symbol,
   wherein the HE-SIG-A field mapped to the first symbol is repeatedly transmitted in the time domain,
   wherein a length of the first symbol is different from a length of the second symbol, and
   wherein the HE-SIG-A field mapped to the first symbol includes bandwidth (BW) information.

2. The STA device of claim 1, wherein the repeatedly transmitted L-SIG field includes at least one of a first subcarrier that carries same information as at least one type of information included in the L-SIG field and at least one of a second subcarrier that carries different information from at least one type of information included in the L-SIG field.

3. A method for transmitting data performed by a station (STA) device in a wireless local area network (WLAN) system, the method comprising:
   generating a physical protocol data unit (PPDU) including a physical preamble and a data field, and
   transmitting the PPDU,
   wherein the physical preamble includes a legacy preamble and a high efficiency (HE) preamble,
   wherein the legacy preamble includes a Legacy-Short Training Field (L-STF), a Legacy-Long Training Field (L-LTF) and a Legacy-Signal (L-SIG) field,
   wherein the HE preamble includes an HE-SIG-A field, an HE-SIG-B field, an HE-STF and an HE-LTF,
   wherein the L-SIG field is repeatedly transmitted in a time domain,
   wherein a part of the HE-SIG-A field is mapped to a first symbol, and a remaining part of the HE-SIG-A field is mapped to a second symbol,
   wherein the HE-SIG-A field mapped to the first symbol is repeatedly transmitted in the time domain,
   wherein a length of the first symbol is different from a length of the second symbol, and
   wherein the HE-SIG-A field mapped to the first symbol includes bandwidth (BW) information.

4. The method of claim 3, wherein the repeatedly transmitted L-SIG field includes at least one of a first subcarrier that carries same information as at least one type of information included in the L-SIG field and at least one of a second subcarrier that carries different information from at least one type of information included in the L-SIG field.

* * * * *